US011384237B2

(12) United States Patent
Fujimoto et al.

(10) Patent No.: US 11,384,237 B2
(45) Date of Patent: Jul. 12, 2022

(54) POLYACETAL RESIN COMPOSITION, MOLDED ARTICLE AND METHOD FOR MANUFACTURING POLYACETAL RESIN COMPOSITION

(71) Applicant: MITSUBISHI ENGINEERING-PLASTICS CORPORATION, Tokyo (JP)

(72) Inventors: Kunihiko Fujimoto, Hiratsuka (JP); Makiko Ooshima, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 0 days.

(21) Appl. No.: 16/622,217

(22) PCT Filed: Jun. 5, 2018

(86) PCT No.: PCT/JP2018/021472
§ 371 (c)(1),
(2) Date: Dec. 12, 2019

(87) PCT Pub. No.: WO2018/230389
PCT Pub. Date: Dec. 20, 2018

(65) Prior Publication Data
US 2020/0115542 A1 Apr. 16, 2020

(30) Foreign Application Priority Data
Jun. 15, 2017 (JP) .............................. JP2017-117461

(51) Int. Cl.
C08L 59/00 (2006.01)
C08L 23/02 (2006.01)
C08L 51/06 (2006.01)
C08L 83/04 (2006.01)

(52) U.S. Cl.
CPC .............. *C08L 59/00* (2013.01); *C08L 23/02* (2013.01); *C08L 51/06* (2013.01); *C08L 83/04* (2013.01); *C08L 2203/30* (2013.01); *C08L 2205/035* (2013.01); *C08L 2310/00* (2013.01)

(58) Field of Classification Search
CPC .......... C08L 59/00; C08L 59/02; C08L 59/04; C08L 23/00; C08L 23/02; C08L 83/04; C08L 83/10; C08L 51/06; C08L 2205/035
See application file for complete search history.

(56) References Cited

U.S. PATENT DOCUMENTS

| 6,602,953 B1* | 8/2003 | Horio ...................... C08L 59/02 |
| | | 525/100 |
| 2002/0115790 A1 | 8/2002 | Doki et al. |
| 2008/0234413 A1 | 9/2008 | Shinohara et al. |
| 2017/0047604 A1* | 2/2017 | Suzuki .................... H01M 8/02 |

FOREIGN PATENT DOCUMENTS

| JP | 2002-194178 A | 7/2002 |
| JP | 2004-244536 A | 9/2004 |
| JP | 2008-260821 A | 10/2008 |
| JP | 2008-260874 A | 10/2008 |
| JP | 4270787 B2 | 6/2009 |
| JP | 2010-522257 A | 7/2010 |
| WO | WO 01/32775 A1 | 5/2001 |
| WO | WO 2008/115458 A1 | 9/2008 |

OTHER PUBLICATIONS

International Preliminary Report on Patentability and English translation of Written Opinion of the International Searching Authority, dated Dec. 17, 2019, issued in PCT/JP2018/021472 (Forms PCT/IB/373 and PCT/ISA/237).
Extended European Search Report for Application No. 18817501.2, dated Feb. 11, 2021.
European Communication pursuant to Article 94(3) EPC for European Application No. 18817501.2, dated Apr. 7, 2022.

* cited by examiner

Primary Examiner — Jeffrey C Mullis
(74) Attorney, Agent, or Firm — Birch, Stewart, Kolasch & Birch, LLP

(57) ABSTRACT

To provide a polyacetal resin composition which is good sliding characteristics and is less likely to produce the blister; a molded article; and a method for manufacturing the polyacetal resin composition. The polyacetal resin composition containing: (A) 100 parts by mass of a polyacetal resin; (B1) a polyolefin resin grafted with a silicone compound; (B2) a non-grafted silicone compound; and (C) 0.5 to 1.8 parts by mass of a polyolefinic lubricant, with a total of content of the silicone compound in the (B1) polyolefin resin and content of the (B2) non-grafted silicone compound, being adjusted to 0.6 to 2.5 parts by mass, per 100 parts by mass of the (A) polyacetal resin, and with (B1)/(B2), which is a ratio by mass of the content of the (B1) polyolefin resin and the content of the (B2) non-grafted silicone compound, being adjusted to 68/32 to 45/55.

6 Claims, No Drawings

POLYACETAL RESIN COMPOSITION, MOLDED ARTICLE AND METHOD FOR MANUFACTURING POLYACETAL RESIN COMPOSITION

TECHNICAL FIELD

This invention relates to a polyacetal resin composition, a molded article, and a method for manufacturing the polyacetal resin composition, and in particular to a polyacetal resin composition suitable for sliding component.

BACKGROUND ART

Polyacetal resin, appreciated for its highly-balanced mechanical characteristics and excellent friction and wear characteristics, is widely used as a material for composing sliding components such as gears, in the fields of automobile and electrical/electronic products. For example, Patent Literature 1 discloses a polyoxymethylene resin composition that contains (A) polyoxymethylene resin; and (B) polyolefin resin composition that is obtained by grafting a silicon compound to a polyolefin resin, and contains (B1) polyolefin resin grafted with a silicone compound, having a ratio of grafting of the silicon compound to the polyolefin resin within the range from 95 to 30% by weight, and (B2) silicone compound; with content of the (B1) polyolefin resin grafted with a silicone compound adjusted to 0.05 to 10 parts by weight per 100 parts by weight of the (A) polyoxymethylene resin, and with a ratio by weight (B1)/(B2) adjusted to 99/1 to 70/30.

CITATION LIST

Patent Literature

[Patent Literature 1] JP-B2-4270787

SUMMARY OF THE INVENTION

Technical Problem

The present inventors, however, found from our investigations that the aforementioned resin composition could cause a blister on a molded article depending on compounding ratio of the individual ingredients. The resin composition is, of course, required to excel in sliding characteristics. It is therefore an object of this invention to solve the aforementioned problem, and is to provide a polyacetal resin composition which is capable of demonstrating, when molded into a molded article, good sliding characteristics and is less likely to produce the blister; a molded article using such polyacetal resin composition; and a method for manufacturing the polyacetal resin composition.

Solution to Problem

The present inventors conducted research to address the above-mentioned problems, and as a result, the problems described above are solved by the following means <1>, and preferably by the following means <2> to <6>.
<1> A polyacetal resin composition comprising:
(A) 100 parts by mass of a polyacetal resin; (B1) a polyolefin resin grafted with a silicone compound; (B2) a non-grafted silicone compound; and
(C) 0.5 to 1.8 parts by mass of a polyolefinic lubricant, with a total of content of the silicone compound in the (B1) polyolefin resin and content of the (B2) non-grafted silicone compound, being adjusted to 0.6 to 2.5 parts by mass, per 100 parts by mass of the (A) polyacetal resin, and
with (B1)/(B2), which is a ratio by mass of the content of the (B1) polyolefin resin and the content of the (B2) non-grafted silicone compound, being adjusted to 68/32 to 45/55.
<2> The polyacetal resin composition of <1>, wherein the (B1)/(B2) is 66/34 to 45/55.
<3> The polyacetal resin composition of <1> or <2>, wherein content of the (C) polyolefinic lubricant is 0.7 to 1.8 parts by mass, per 100 parts by mass of the (A) polyacetal resin.
<4> A molded article obtainable by molding the polyacetal resin composition described in any one of <1> to <3>.
<5> The molded article of <4>, wherein the molded article is a sliding component.
<6> A method for manufacturing the polyacetal resin composition described in any one of <1> to <3>, the method comprising melt-kneading a master batch obtained by kneading the (B2) non-grafted silicone compound into the (A) polyacetal resin, together with the (A) polyacetal resin, and the (B1) polyolefin resin grafted with a silicone compound.

Advantageous Effects of Invention

With this invention, it now became possible to provide a polyacetal resin composition which is capable of demonstrating, when molded into a molded article, good sliding characteristics and is less likely to produce the blister; a molded article using such polyacetal resin composition; and a method for manufacturing the polyacetal resin composition.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The polyacetal resin composition of this invention (occasionally referred simply to as "resin composition of this invention") includes (A) 100 parts by mass of a polyacetal resin; (B1) a polyolefin resin grafted with a silicone compound; (B2) a non-grafted silicone compound; and (C) 0.5 to 1.8 parts by mass of a polyolefinic lubricant, with a total of content of the silicone compound in the (B1) polyolefin resin and content of the (B2) non-grafted silicone compound, being adjusted to 0.6 to 2.5 parts by mass, per 100 parts by mass of the (A) polyacetal resin, and with (B1)/(B2), which is a ratio by mass of content of the (B1) polyolefin resin and content of the (B2) non-grafted silicone compound, being adjusted to 68/32 to 45/55. With such structure, it now becomes possible to provide a polyacetal resin composition which is capable of demonstrating, when molded into a molded article, good sliding characteristics and is less likely to produce the blister. Although the silicone compound is necessary for improving the sliding characteristics, the present inventors found that the blister could occasionally occur if the non-grafted silicone compound was compounded in the form of master batch using the polyolefin resin. Our further investigations revealed that the sliding characteristics and the blister were largely affected by the total of the content of silicone compound in the (B1) polyolefin resin and the content of the (B2) non-grafted silicone compound, and by the ratio by mass ((B1)/(B2)) of the (B1) polyolefin resin and the (B2) non-grafted silicone compound. On the basis of these findings, this invention succeeded in providing a polyacetal resin composition which is capable of effectively suppressing the blister when molded into a molded article, and further excels in sliding characteristics.

<(A) Polyacetal Resin>

The (A) polyacetal resin used this invention is a polymer having an acetal structure —(—O—CRH—)$_n$— (where, R represents a hydrogen atom or an organic group) as a repeating unit, and usually has a oxymethylene group (—CH$_2$O—), having a hydrogen atom for R, as a major structural unit. The polyacetal resin used this invention includes not only acetal homopolymer composed only of such repeating structure, but also includes copolymer (including block copolymer), terpolymer and so forth that include one or more kinds of structural units other than the oxymethylene group, and still may have a branched or crosslinked structure, besides a linear structure.

The structural unit other than the aforementioned oxymethylene group is exemplified by optionally branched oxyalkylene groups having 2 or more and 10 or less carbon atoms, such as oxyethylene group (—CH$_2$CH$_2$O—), oxypropylene group (—CH$_2$CH$_2$CH$_2$O—), and oxybutylene group (—CH$_2$CH$_2$CH$_2$CH$_2$O—). Among them, optionally branched oxyalkylene groups having 2 or more and 4 or less carbon atoms are preferable, and oxyethylene group is particularly preferable. Content of such oxyalkylene structural units other than oxymethylene group, in the polyacetal resin, is preferably 0.1 mol % or more and 20 mol % or less, and more preferably 0.1 mol % or more and 15 mol % or less.

The method for manufacturing the polyacetal resin used in this invention is freely selectable, so that the resin may be manufactured by any freely selectable one of known methods. For example, a polyacetal resin having, as the structural units, oxymethylene group and oxyalkylene group having 2 or more and 4 or less carbon atoms may be manufacturing by a method based on copolymerization of a cyclic oligomer of oxymethylene groups such as formaldehyde trimer (trioxane) or tetramer (tetraoxane), with a cyclic oligomer containing oxyalkylene group having 2 or more and 4 or less carbon atoms such as ethylene oxide, 1,3-dioxolane, 1,3,6-trioxocane, 1,3-dioxepan or the like.

Among them, the polyacetal resin used in this invention is preferably a copolymer of cyclic oligomer such as trioxane, tetraoxane or the like, with ethylene oxide or 1,3-dioxolane, and particularly a copolymer of trioxane with 1,3-dioxolane. The melt viscosity is freely selectable, and is usually 0.01 to 150 g/10 min in terms of melt index (MI) [ASTM-D1238: 190° C., under 2.16 kg load], preferably 0.1 to 100 g/10 min, and particularly 1 to 70 g/10 min.

In the resin composition of this invention, the polyacetal resin preferably accounts for 90% by mass or more of the composition, which is more preferably 93% by mass or more. The resin composition of this invention may employ the polyacetal resin to prepare a master batch. When used for preparing the master batch, also the content of such polyacetal resin will be summed up into the aforementioned content, as will be described later.

The resin composition of this invention may contain only one type of polyacetal resin, or may contain two or more types. When two or more types are contained, the total content preferably satisfies the aforementioned ranges.

<(B1) Polyolefin Resin Grafted with Silicone Compound>

The (B1) polyolefin resin grafted with a silicone compound used in this invention is preferably a polyolefin resin (may optionally contain a small amount of vinyl monomer such as vinyl acetate) such as low-density polyethylene, straight chain low-density polyethylene, high-density polyethylene, ethylene-vinyl acetate copolymer, ethylene-methyl methacrylate copolymer, ethylene-ethyl acrylate copolymer, polymethylpentene, polypropylene and tetrafluoroethylene-ethylene copolymer, grafted with a silicone compound such as polydimethylsiloxane represented by formula (1) below. The polyolefin resin is preferably a polyethylene-based resin.

[Chemical Formula 1]

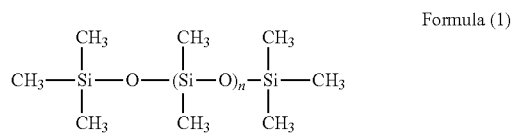

Formula (1)

The methyl group in the formula (1) above may be substituted by a substituent that contains a group selected from alkyl group having two or more carbon atoms, phenyl group, ether group, ester group, hydroxy group, amino group, epoxy group, carboxy group, carbinol group, methacryl group, mercapto group, phenol group, vinyl group, allyl group, polyether group and fluorine-containing alkyl group. Taking grafting into consideration, the methyl group is preferably substituted by a substituent that contains a vinyl group or allyl group, and is more preferably substituted by a substituent that contains a vinyl group. The substituent that contains a group selected from the alkyl groups and so forth is more preferably a substituent solely composed of the aforementioned alkyl groups and so forth.

The silicone compound represented by the formula (1) preferably has the average degree of polymerization n within the range from 1000 to 10000. Within such range, the sliding characteristics may further be improved.

The silicone compound represented by the formula (1) preferably has contents of cyclic low molecular weight monomer and oligomer suppressed as possible, from the viewpoint of antifouling for electrical contact point.

Now in the (B1) polyolefin resin used in this invention, the individual polymer chains preferably remain independent without being crosslinked with each other. Hence a crosslinked (three-dimensionally structured) resin with rubber elasticity, having therein principal chains of the (B1) polyolefin resin mutually crosslinked by the grafted silicone compound, does not fall in a category of the (B1) polyolefin resin used in this invention in a general sense.

The (B1) polyolefin resin preferably has a silicone content of 20 to 70% by mass, which is more preferably 20 to 60% by mass, even more preferably 30 to 50% by mass, and yet more preferably 35 to 45% by mass.

The resin composition of this invention preferably contains 0.6 to 2.5 parts by mass of the (B1) polyolefin resin per 100 parts by mass of polyacetal resin, the content is more preferably 0.6 to 2.3 parts by mass, and even more preferably 0.7 to 2.1 parts by mass.

The resin composition of this invention may contain only one type of the (B1) polyolefin resin, or may contain two or more types. When two or more types are contained, the total content preferably falls in the aforementioned ranges.

<(B2) Non-Grafted Silicone Compound>

The (B2) non-grafted silicone compound used in this invention is freely selectable from known ones. Specific examples include, not only the silicones composed of polydimethylsiloxane, such as silicone compounds represented by the formula (1) and described above under the title of (B1) Polyolefin resin, but also include substituted silicones composed of polydimethylsiloxane whose methyl groups are partially or totally substituted by alkyl group having two or more carbon atoms, phenyl group, halogenated phenyl group, ester group, halogenated ester group, polyether group or the like; modified silicones composed of polydimethylsiloxane further having epoxy group, amino group, alcoholic hydroxy group, polyether group or the like; alkyl-aralkyl silicones having dimethylsiloxane unit and phenylmethylsilioxane unit; and alkyl-aralkyl, polyether-modified silicones having siloxane unit and phenylmethyl siloxane unit, in which a part of methyl groups of dimethylsiloxane unit is substituted by polyether.

The (B2) non-grafted silicone compound is preferably used in the form of master batch using a thermoplastic resin, and is more preferably used in the form of a master batch using the (A) polyacetal resin. Content of the silicone compound in the master batch is preferably 10 to 60% by mass, more preferably 20 to 55% by mass, and even more preferably 30 to 50% by mass.

The resin composition of this invention preferably contains, per 100 parts by mass of polyacetal resin, 0.3 to 2.0 parts by mass of the (B2) non-grafted silicone compound (excluding the amount of thermoplastic resin when the thermoplastic resin is used for preparing the master batch), the content is more preferably 0.35 to 1.8 parts by mass, and even more preferably 0.4 to 1.4 parts by mass.

The resin composition of this invention may contain only one type of the (B2) non-grafted silicone compound, or may contain two or more types. When two or more types are contained, the total content preferably falls in the aforementioned ranges.

<Relation between (B1) and (B2)>

The resin composition of this invention has the total of content of the silicone compound in the (B1) polyolefin resin and content of the (B2) non-grafted silicone compound, being adjusted to 0.6 to 2.5 parts by mass, per 100 parts by mass of the (A) polyacetal resin. The total of the contents is preferably 0.7 parts by mass or larger. The upper limit is preferably 2.0 parts by mass or smaller, and more preferably 1.5 parts by mass or smaller.

Meanwhile, the resin composition of this invention has (B1)/(B2), which is a ratio by mass of the content of the (B1) polyolefin resin and the content of the (B2) non-grafted silicone compound, being adjusted to 68/32 to 45/55. The ratio is preferably 66/34 to 45/55, more preferably 66/34 to 47/53, even more preferably 66/34 to 48/52, and yet may be 66/34 to 49/51.

<(C) Polyolefinic Lubricant>

The polyolefinic lubricant used in this invention may be any of known ones. The polyolefinic lubricant is preferably polyethylene-based lubricant (for example, low-density polyethylene, straight-chain, low-density polyethylene, high-density polyethylene, and ethylene-vinyl acetate copolymer) and polypropylene-based lubricant (for example, polypropylene), and is more preferably the polyethylene-based lubricant.

The polyolefinic lubricant preferably has a molecular weight, measured by the viscometry, of 500 to 30,000.

For details of the polyolefinic lubricant, description in paragraphs [0030] and [0031] of JP-A-2009-275094, and description in paragraphs [0019] to [0023] of JP-A-2008-214490 may be referred to, the contents of which are incorporated by reference into the present specification.

One preferred embodiment of the (C) polyolefinic lubricant used in this invention relates to a (C1) polyolefinic lubricant with an acid value of 0.1 to 10 mg KOH/g. The acid value is preferably 0.5 to 5 mg KOH/g, more preferably 0.5 to 3 mg KOH/g, and even more preferably 0.5 to 1.5 mg KOH/g. The acid value is measured in compliance with JIS K0070. The (C1) polyolefinic lubricant with an acid value of 0.1 to 10 mg KOH/g preferably has a molecular weight, measured by viscometry, of 1,000 to 10,000, which is more preferably 1,000 to 7,000, and even more preferably 3,000 to 6,000.

Another preferred embodiment of the (C) polyolefinic lubricant used in this invention relates to a (C2) polyolefinic lubricant with a density of 900 to 970 kg/m$^3$ (excluding those that fall under (C1)). The density is preferably 910 to 945 kg/m$^3$. The density is measured in compliance with JIS K7112. The (C2) polyolefinic lubricant preferably has a molecular weight, measured by viscometry, of 1,000 to 10,000, which is more preferably 5,000 to 9,000. The (C2) polyolefinic lubricant preferably has a melting point, measured by differential scanning calorimetry, of 105 to 120° C., which is more preferably 109 to 118° C., and even more preferably 112 to 117° C.

In this invention, it is particularly preferable to use the (C1) polyolefinic lubricant with an acid value of 0.1 to 10 mg KOH/g, and the (C2) polyolefinic lubricant with a density of 900 to 970 kg/m$^3$ in a combined manner. The (C1) polyolefinic lubricant with an acid value of 0.1 to 10 mg KOH/g, and the (C2) polyolefinic lubricant with a density of 900 to 970 kg/m$^3$ preferably satisfy the ratio by mass (C1)/(C2) of 40/60 to 60/40, which is more preferably 45/55 to 55/45. Within these ranges, the effects of this invention will be demonstrated more efficiently.

The polyolefinic lubricant may be any of those commercially available, and is exemplified by Hi-WAX Series from Mitsui Chemicals, Inc., Sanwax Series from Sanyo Chemical Industries, Ltd., and Ceridust Series from Clariant Chemicals Ltd.

The resin composition of this invention contains 0.5 to 1.8 parts by mass of the (C) polyolefinic lubricant, per 100 parts by mass of the polyacetal resin. The lower limit of the content of the (C) polyolefinic lubricant is preferably 0.7 parts by mass or higher, more preferably 0.8 parts by mass or higher, and even more preferably 0.9 parts by mass or higher. The upper limit of the content is preferably 1.6 parts by mass or lower.

The resin composition of this invention may contain only one type of the (C) polyolefinic lubricant, or may contain two or more types. When two or more types are contained, the total content preferably satisfies the aforementioned ranges.

The resin composition of this invention preferably has a "content of silicone compound/content of (C) ingredient", which is a ratio by mass of the content of (C) ingredient relative to the content of silicone compound in the composition, of 0.4 or larger, which is more preferably 0.5 or larger. Meanwhile, the upper limit of the "content of silicone compound/content of (C) ingredient" is preferably 3.0 or smaller, more preferably 2.9 or smaller, even more preferably 1.3 or smaller, and yet more preferably 1.0 or smaller.

Within these ranges, an effect of balancing good sliding characteristics with suppression of blister will be demonstrated more effectively.

The resin composition of this invention may contain an additional silicone compound other than those in the (B1) polyolefin resin and the (B2) non-grafted silicone compound, or may be substantially free of such additional silicone compound. Now "substantially free of . . . " means that the ratio of the additional silicone compound is 1% by mass or less relative to the total content of silicone compounds in the resin composition of this invention, which is preferably 0.5% by mass or less.

Preferred embodiments of this invention are exemplified by compliance with at least one of (1) to (4) below, more preferably by compliance with at least two of them, even more preferably by compliance with at least three of them, and even more preferably by compliance with four of them:

(1) the (B1) polyolefin resin has a silicone content of 35 to 45% by mass;

(2) the (C1) polyolefinic lubricant with an acid value of 0.1 to 10 mg KOH/g is contained, wherein, the acid value is 0.5 to 1.5 mg KOH/g, and, the (C1) olefinic lubricant has a molecular weight, measured by viscometry, of 3,000 to 6,000;

(3) the (C2) polyolefinic lubricant with a density of 900 to 970 kg/m$^3$ is contained, and, the (C2) olefinic lubricant has a molecular weight, measured by viscometry, of 5,000 to 9,000; and (4) both of the (C1) polyolefinic lubricant with an acid value of 0.1 to 10 mg KOH/g and the (C2) polyolefinic lubricant with a density of 900 to 970 kg/m$^3$ are contained.

<Other Ingredients>

The resin composition of this invention may contain any additive or filler that is freely selectable from known ones, without adversely affecting the purpose of this invention. The additive and filler employable in this invention are exemplified by thermoplastic resin other than polyacetal resin and polyolefin resin ((B1) polyolefin resin and (C) olefinic lubricant), antistatic agent, UV absorber, weathering agent, light stabilizer, carbon fiber, glass fiber, glass flake, talc, mica, calcium carbonate, potassium titanate whisker, and pigment (also including black pigment such as carbon black). For details of these substances, description in paragraphs [0113] to [0124] of JP-A-2017-025257 may be referred to, the contents of which are incorporated by reference into the present specification.

The resin composition of this invention may contain a lubricant other than the (C) polyolefinic lubricant, or may be free of such lubricant. One embodiment of the resin composition of this invention is exemplified by a mode which is substantially free of lubricant (additional lubricant) other than the polyolefinic lubricant. Now "substantially free of additional lubricant" means that the content of such additional lubricant contained in the resin composition of this invention is 1.0 to 0% by mass relative to the content of the lubricant other than the polyolefinic lubricant, which is preferably 0.1 to 0% by mass.

In the resin composition of this invention, the content of the polyolefin resin is preferably 0.5 to 3.0% by mass, and is more preferably 1.0 to 2.5% by mass. It is preferable that the resin composition of this invention is substantially free of polyolefin resin (additional polyolefin resin) other than the (B1) polyolefin resin grafted with a silicone compound and the (C) polyolefinic lubricant. Now "substantially free of . . . " means that the content of such additional polyolefin resin in the resin composition of this invention is 1.0 to 0% by mass relative to the total content of the (B1) polyolefin resin grafted with a silicone compound and the (C) polyolefinic lubricant, which is preferably 0.1 to 0% by mass.

The resin composition of this invention may contain a heat stabilizer, but not always necessarily. Mixing with the heat stabilizer can effectively suppress formaldehyde from being released. Mixing with a sterically hindered phenol is detailed in paragraphs [0038] to [0046] of JP-A-2008-214490, and in paragraphs [0097] to [0107] of JP-A-2017-025257, the contents of which are incorporated by reference into the present specification.

In this invention, also a composition substantially free of heat stabilizer is acceptable. Now "substantially free of . . . " means that the content is less than 0.01 parts by mass, per 100 parts by mass of the (A) polyacetal resin, which is preferably 0.001 parts by mass.

<Method for Manufacturing Polyacetal Resin Composition>

The polyacetal resin composition of this invention contains the aforementioned essential ingredients and the aforementioned optional ingredients which are freely selectable. Method for manufacturing the polyacetal resin composition is not specifically limited, and may be selectable from known methods for manufacturing resin composition, by which the aforementioned starting materials are mixed and kneaded.

One example of the method for manufacturing the polyacetal resin composition of this invention is exemplified by a method that includes melt-kneading a master batch obtained by kneading the (B2) non-grafted silicone compound into the (A) polyacetal resin, together with the (A) polyacetal resin and the (B1) polyolefin resin grafted with a silicone compound.

By thus mixing the (B2) non-grafted silicone compound in the form of master batch, the handleability may be improved. The polyacetal resin used for preparing the master batch may be same as, or different from, a polyacetal resin to be mixed as a neat resin.

In the method for manufacturing the polyacetal resin composition of this invention, the (C) polyolefinic lubricant may be fed concurrently with the (A) polyacetal resin and the (B1) polyolefin resin, or may be added later. In a special case where the (C) polyolefinic lubricant is available in a powder form, also the later addition is exemplified as a particularly preferred mode.

Kneading machine is exemplified by kneader, Banbury mixer and extruder. There are no special limitations on various conditions and apparatuses for mixing and kneading, so that the conditions may be determined by free choice from known ones. Kneading is preferably conducted at a temperature equal to or higher than the temperature at which the polyacetal resin melts, which is more specifically equal to or higher than the melting temperature of the (A) polyacetal resin (usually 180° C. or higher).

<Molded Article>

The molded article of this invention is molded from the polyacetal resin composition of this invention. The resin composition of this invention is pelletized, and the thus obtained pellets are molded by a variety of molding methods into the molded article. Alternatively, the resin composition melt-kneaded in the extruder may be directly molded, without being pelletized, into the molded article.

The molded article may have any form without special limitation, which is properly selectable depending on applications and purposes of the molded article, typically from board form, plate form, rod form, sheet form, film form, cylindrical form, ring form, circular form, elliptic form, gear form, polygonal form, irregularly shaped article, hollow article, frame shape, box shape, panel shape and so forth. The molded article of this invention may be a finished product or may be a component.

Method for molding the molded article is not specifically limited, and may be selectable from known molding methods which are exemplified by injection molding, injection compression molding, extrusion molding, profile extrusion molding, transfer molding, hollow molding, gas-assisted hollow molding, blow molding, extrusion blow molding, IMC (in-mold coating) molding, rotational molding, multilayer molding, two color molding, insert molding, sandwich molding, foam molding and pressure molding.

The molded article molded from the resin composition of this invention is preferably used as a sliding component (sliding member).

Specific examples of the sliding component are exemplified by gear, rotating shaft, bearing, various gears, cam, end-face material of mechanical seal, and valve seat of valve; sealing components such as V ring, rod packing, piston ring and rider ring; sliding components such as rotating shaft of compressor, rotating sleeve, piston, impeller and roller, all of which are required to have advanced quality in electrical/electronic equipment, office appliance, vehicle (automobile), industrial equipment and so forth.

The sliding component of this invention is not only applicable while being combined with the sliding component of this invention, but is also applicable while being combined with other sliding component made of resin or sliding component made of fiber-reinforced resin, and still also with sliding component made of ceramic or metal.

EXAMPLES

This invention will be further detailed below, referring to Examples. Note that materials, amount of consumption, ratio, detail of process and procedure of process may be properly modified without departing from the spirit of this invention. The scope of this invention is therefore not limited by the specific examples described below.

<Starting Materials>
(A) Polyacetal Resin (POM)
Oxymethylene copolymer of trioxane and 1,3-dioxolane, and is a polyacetal resin containing 1.5 mol % of oxyethylene unit (MI: 30 g/10 min) (melt index (MI) was measured in compliance with ASTM-D1238, at 190° C., under 2.16 kg load.)
(B1) Polyolefin Resin Grafted with Silicone Compound
BY27-213: silicone-grafted polyolefin, from Dow Corning Toray Co., Ltd., percentage of silicone content=40% by mass
BY27-202H: silicone-grafted polyolefin, from Dow Corning Toray Co., Ltd., percentage of silicone content=60% by mass
BY27-218: silicone-grafted polyolefin, from Dow Corning Toray Co., Ltd., percentage of silicone content=50% by mass
(B2) Master Batch of Non-Grafted Silicone Compound:
MB40-006: polyacetal/silicone master batch, from Dow Corning Toray Co., Ltd., percentage of (B2) silicone compound content in the master batch=40% by mass.
(C)-1: Polyolefinic Lubricant
Hi-WAX 405MP: from Mitsui Chemicals, Inc., polyethylene wax, oxidized type, acid value=1 mg KOH/g, molecular weight (viscometry)=4,000
Hi-WAX 220MP: from Mitsui Chemicals, Inc., polyethylene wax, oxidized type, acid value=1 mg KOH/g, molecular weight (viscometry)=2,000
Ceridust 3715: from Clariant Chemicals Ltd., polyethylene wax, oxidized type, acid value=2 to 5 mg KOH/g
(C)-2: Polyolefinic Lubricant
Hi-WAX 720P: from Mitsui Chemicals, Inc., polyethylene wax, low-density type, density=920 kg/m$^3$, molecular weight (viscometry)=7,200, melting point=113° C.
Hi-WAX 420P: from Mitsui Chemicals, Inc., polyethylene wax, low-density type, density=930 kg/m$^3$, molecular weight (viscometry)=4,000, melting point=118° C.
Licowax 521: from Clariant Chemicals Ltd., polyethylene wax, low-density type, density=950 kg/m$^3$, molecular weight (viscometry)=4,200, melting point=101 to 106° C.
Polyethylene resin: LJ803, from Japan Polyethylene Corporation Example 1

Polyacetal resin and other starting materials, fed according to a mass proportion summarized in Table 1, were melt-kneaded in a twin screw extruder (PCM-30, from Ikegai Corporation, screw diameter=30 mm), at a rotating speed of screw of 120 rpm, and a preset cylinder temperature of 190° C., the content was extruded into strands, and cut using a pelletizer, to manufacture pellets of a polyacetal resin composition.

<<Blister>>

The thus obtained pellets of the polyacetal resin composition were subjected to injection molding using SE-30DUZ from Sumitomo Heavy Industries, Ltd., at a cylinder temperature of 215° C. and a die temperature of 40° C., to manufacture a plate specimen having a size of 100 mm×40 mm×2 mm.

The thus obtained plate specimen was evaluated regarding the surface condition according to criteria below, where C and above represent practically acceptable levels:
A: blister not observed at injection speed of 100 mm/sec;
B: blister observed at injection speed of 90 mm/sec or above;
C: blister observed at injection speed of 70 mm/sec or above, and below 90 mm/sec; and
D: blister observed at injection speed of 60 mm/sec or above, and below 70 mm/sec.

<<Wear Against Metal (Sliding Characteristics)>>

The thus obtained pellets of the polyacetal resin composition were subjected to injection molding using SE-30DUZ from Sumitomo Heavy Industries, Ltd., at a cylinder temperature of 200° C. and a die temperature of 60° C., to manufacture a cylindrical thrust specimen (JIS K7218 method, size: 25.6 mm (outer diameter)×20.0 mm (inner diameter)×15.0 mm (height)).

On a thrust type abrasion and wear tester, the thrust specimen (the specimen obtained as described above) and a steel material were arranged so as to oppose their end faces, while placing the thrust specimen on the upside and the mating member on the downside, with the abutting surface aligned horizontally. The test was conducted while fixing the upper thrust specimen, and rotating the lower mating member in the circumferential direction. Measurement was conducted in an environment with a temperature of 23° C. and humidity of 50%, at a surface pressure of 0.5 MPa, average linear velocity at inner diameter of 0.3 m/sec, and a running time of 20 hours, to thereby determine specific wear amount expressed in ×10$^{-2}$ mm$^3$/kgf·km.

The thrust type abrasion and wear tester was obtained from Orientec Co., Ltd.

Evaluation was made according to the criteria below, where C and above represent practically acceptable levels:
A: 1.0 [×10$^{-2}$ mm$^3$/kgf·km] or below;
B: exceeding 1.0 [×10$^{-2}$ mm$^3$/kgf·km], and 5.0 [×10$^{-2}$ mm$^3$/kgf·km] or below;

C: exceeding 5.0 [×10$^{-2}$ mm$^3$/kgf·km], and 10.0 [×10$^{-2}$ mm$^3$/kgf·km] or below; and D: 10.0 [×10$^{-2}$ mm$^3$/kgf·km] or above.

<<Comprehensive Evaluation>>

The polyacetal resin composition was comprehensively evaluated, taking the blister and wear against metal into consideration. More specifically, the comprehensive evaluation was made, while considering concrete injection speed at which the blister is observed, a concrete value of specific wear amount, and practicality, wherein the numeral 1 represents the best evaluation, and the numeral 9 represents the worst evaluation.

Examples 2 to 17, and Comparative Examples 1 to 15

Manufacture and evaluation were conducted in the same way as in Example 1, except that chemical compositions were changed as listed in Tables 1 and 2. Results were summarized in Tables 1 and 2.

TABLE 1

| Number of Example | 1 | 2 | 3 | 4 | 5 | 6 | 7 | 8 | 9 |
|---|---|---|---|---|---|---|---|---|---|
| (A) Polyacetal resin | 100 | 100 | 100 | 100 | 100 | 100 | 100 | 100 | 100 |
| (B1) Polyolefin resin grafted with a silicone compound (BY27-213) | 1 | 1.3 | 1 | 1 | 0.8 | 1.3 | 1.65 | 2 | 0.8 |
| (B1) Polyolefin resin grafted with a silicone compound (BY27-202H) | | | | | | | | | |
| (B1) Polyolefin resin grafted with a silicone compound (BY27-218) | | | | | | | | | |
| (B2) Master Batch of Non-Grafted Silicone Compound | 1.5 | 1.8 | 1.5 | 1.5 | 1.2 | 1.8 | 2.1 | 3 | 2.3 |
| (C)-1: Polyolefinic lubricant Hi-WAX220MP | 1.5 | | 0.75 | 0.5 | 0.75 | 0.75 | | | |
| (C)-1: Polyolefinic lubricant Hi-WAX220MP | | 1.5 | | | | | 0.5 | 0.35 | 0.75 |
| (C)-1: Polyolefinic lubricant Ceridust3715 | | | | | | | | | |
| (C)-2: Polyolefinic lubricant Hi-WAX720P | | | | | | 0.75 | 0.75 | | |
| (C)-2: Polyolefinic lubricant Hi-WAX420P | | | 0.75 | 0.5 | | | 0.5 | 0.35 | 0.75 |
| (C)-2: Polyolefinic lubricant Licowax521 | | | | | | | | | |
| Polyethylene resin | — | — | — | — | — | — | — | — | — |
| (B1)/[(B1) + (B2)]*100 | 63 | 64 | 63 | 63 | 63 | 64 | 66 | 63 | 47 |
| Content of silicone compound in the composition | 1.00 | 1.24 | 1 | 1.0 | 0.8 | 1.24 | 1.5 | 2 | 1.24 |
| Content of silicone compound/(C) Content of ingredient | 0.7 | 0.8 | 0.7 | 1.0 | 0.5 | 0.8 | 1.5 | 2.9 | 0.8 |
| Blister | B | B | B | A | A | B | B | B | C |
| Wear against Metal | B | C | A | B | A | B | B | B | B |
| Comprehensive Evaluation | 3 | 5 | 2 | 2 | 1 | 3 | 3 | 3 | 5 |

| Number of Example | 10 | 11 | 12 | 13 | 14 | 15 | 16 | 17 |
|---|---|---|---|---|---|---|---|---|
| (A) Polyacetal resin | 100 | 100 | 100 | 100 | 100 | 100 | 100 | 100 |
| (B1) Polyolefin resin grafted with a silicone compound (BY27-213) | | | | | | | | |
| (B1) Polyolefin resin grafted with a silicone compound (BY27-202H) | 0.8 | 0.8 | 1.2 | 1.2 | 1.2 | | | |
| (B1) Polyolefin resin grafted with a silicone compound (BY27-218) | | | | | | 1 | 1.5 | 0.8 |
| (B2) Master Batch of Non-Grafted Silicone Compound | 1.2 | 1.2 | 1.7 | 1.7 | 1.7 | 1.4 | 2 | 2 |
| (C)-1: Polyolefinic lubricant Hi-WAX220MP | 1.5 | | 0.75 | | | | 0.75 | 0.75 |
| (C)-1: Polyolefinic lubricant Hi-WAX220MP | | | | | 0.75 | | | |
| (C)-1: Polyolefinic lubricant Ceridust3715 | | 1.5 | | 0.75 | | | | |
| (C)-2: Polyolefinic lubricant Hi-WAX720P | | | | 0.75 | | 1.5 | | |
| (C)-2: Polyolefinic lubricant Hi-WAX420P | | | 0.75 | | | | 0.75 | |
| (C)-2: Polyolefinic lubricant Licowax521 | | | | | 0.75 | | | 0.75 |
| Polyethylene resin | — | — | — | — | — | — | — | — |
| (B1)/[(B1) + (B2)]*100 | 63 | 63 | 64 | 64 | 64 | 64 | 65 | 50 |
| Content of silicone compound in the composition | 0.96 | 0.96 | 1.4 | 1.4 | 1.4 | 1.06 | 1.55 | 1.2 |
| Content of silicone compound/(C) Content of ingredient | 0.6 | 0.6 | 0.9 | 0.9 | 0.9 | 0.7 | 1 | 0.8 |
| Blister | B | C | B | B | B | B | B | B |
| Wear against Metal | C | C | B | B | C | C | B | B |
| Comprehensive Evaluation | 5 | 6 | 3 | 3 | 5 | 5 | 3 | 3 |

TABLE 2

| Number of Comparative Example | 1 | 2 | 3 | 4 | 5 | 6 | 7 | 8 |
|---|---|---|---|---|---|---|---|---|
| (A)Polyacetal resin | 100 | 100 | 100 | 100 | 100 | 100 | 100 | 100 |
| (B1)Polyolefin resin grafted with a silicone compound(BY27-213) | 1.2 | 1 | 2.5 | | 0.5 | 1 | 2.4 | |
| (B1)Polyolefin resin grafted with a silicone compound(BY27-202H) | | | | | | | | |
| (B1)Polyolefin resin grafted with a silicone compound(BY27-218) | | | | | | | | |
| (B2)Master Batch of Non-Grafted Silicone Compound(Silicone is included 40% of density) | 1.2 | 1.5 | | 3.1 | 0.8 | 1.5 | 1.4 | 1.44 |
| (C)-1: Polyolefinic lubricant Hi-WAX405MP | | 1 | 0.6 | 0.75 | 0.6 | 0.2 | 0.6 | |
| (C)-1: Polyolefinic lubricant Hi-WAX220MP | | | | | | | | 0.6 |
| (C)-1: Polyolefinic lubricant Ceridust3715 | | | | | | | | |
| (C)-2: Polyolefinic lubricant Hi-WAX720P | | | | | 0.6 | 0.2 | | |
| (C)-2: Polyolefinic lubricant Hi-WAX420P | | 1 | 0.6 | 0.75 | | | 0.6 | 0.6 |
| (C)-2: Polyolefinic lubricant Licowax521 | | | | | | | | |
| Polyethylene resin | — | — | — | — | — | — | — | 1.07 |
| (B1)/[(B1) + (B2)]*100 | 71 | 63 | 100 | 0 | 61 | 63 | 81 | 0 |
| Content of silicone compound in the composition | 0.96 | 1.00 | 1 | 1.24 | 0.52 | 1 | 1.52 | 0.58 |
| Content of silicone compound/(C)Content of ingredient | — | 0.5 | 0.8 | 0.8 | 0.4 | 2.5 | 1.3 | 0.5 |
| Blister | B | D | C | C | A | B | D | D |
| Wear against Metal | D | B | D | D | D | D | B | C |
| Comprehensive Evaluation | 8 | 8 | 9 | 9 | 7 | 8 | 8 | 9 |

| Number of Comparative Example | 9 | 10 | 11 | 12 | 13 | 14 | 15 |
|---|---|---|---|---|---|---|---|
| (A)Polyacetal resin | 100 | 100 | 100 | 100 | 100 | 100 | 100 |
| (B1)Polyolefin resin grafted with a silicone compound(BY27-213) | | | | | | | 1.2 |
| (B1)Polyolefin resin grafted with a silicone compound(BY27-202H) | | 0.8 | 0.8 | | | | |
| (B1)Polyolefin resin grafted with a silicone compound(BY27-218) | | | | 2 | | | |
| (B2)Master Batch of Non-Grafted Silicone Compound(Silicone is included 40% of density) | 2.5 | 1.2 | 1.2 | | 3.1 | 5 | 1.2 |
| (C)-1: Polyolefinic lubricant Hi-WAX405MP | | | 2 | 0.6 | | | |
| (C)-1: Polyolefinic lubricant Hi-WAX220MP | 0.6 | | | | 0.75 | | |
| (C)-1: Polyolefinic lubricant Ceridust3715 | | | | | | 1.5 | 0.6 |
| (C)-2: Polyolefinic lubricant Hi-WAX720P | | | | | | | |
| (C)-2: Polyolefinic lubricant Hi-WAX420P | 0.6 | | | 0.75 | | | 0.6 |
| (C)-2: Polyolefinic lubricant Licowax521 | | | | 0.75 | | | |
| Polyethylene resin | 1.07 | — | — | — | — | — | — |
| (B1)/[(B1) + (B2)]*100 | 0 | 63 | 63 | 100 | 0 | 0 | 71 |
| Content of silicone compound in the composition | 1 | 0.96 | 0.96 | 1 | 1.24 | 2 | 0.96 |
| Content of silicone compound/(C)Content of ingredient | 0.8 | — | 0.5 | 0.8 | 0.8 | 1.3 | 0.8 |
| Blister | D | B | D | D | C | D | D |
| Wear against Metal | A | D | C | B | D | C | C |
| Comprehensive Evaluation | 7 | 8 | 9 | 8 | 9 | 9 | 9 |

In Tables 1 and 2, the amount of staring materials are given in parts by mass.

In Tables 1 and 2, the amount of "(A) Polyacetal resin" does not contain the amount of polyacetal resin used for preparing the master batch contained in the (B2) non-grafted silicone compound.

In Tables 1 and 2, the amount of "Master batch of (B2) non-grafted silicone compound" represents the total amount of the (B2) non-grafted silicone compound, and the polyacetal resin used for preparing the master batch (that is, the amount of master batch that was added).

In Tables 1 and 2, the content of "(B1) Polyolefin resin", the content of "(B2) Silicone compound in master batch", and the content of silicone compound in the composition are given by the amounts (parts by mass), per 100 parts by mass of the (A) polyacetal resin.

In "(BB)/[(B1)+(B2)]*100", (B1) represents the content of the (B1) polyolefin resin, and (B2) represents the content of the silicone compound in (B2).

"Content of silicone compound/content of (C) ingredient" represents the ratio by mass of the "total content of silicone compound in the composition" and "content of (C) ingredient".

As is clear from the results, the molded articles that are well suppressed from blistering and excel in the sliding characteristics were obtained, by using the resin compositions of this invention (Examples 1 to 17).

In contrast, the resin compositions having no polyolefinic lubricant added thereto (Comparative Examples 1, 10), and the resin composition having polyolefinic lubricant added thereto but the content was small (Comparative Example 6), showed poor sliding characteristics. Meanwhile, the resin composition with too much contents of polyolefinic lubricant (Comparative Examples 2, 9) were found to produce the blister.

The resin compositions having no non-grafted silicone compound added thereto (Comparative Examples 3, 12), and the resin composition having an insufficient ratio of non-grafted silicone compound, relative to the polyolefin resin grafted with a silicone compound (Comparative Example 7), were found to produce the blister.

Meanwhile, the resin compositions having no polyolefin resin grafted with a silicone compound added thereto (Comparative Examples 4, 8, 9, 13 and 14) were found to produce blister, and to have poor sliding characteristics. In particular, the resin composition having a proper amount of silicone compound added thereto, but having the non-grafted silicone compound and the polyolefin resin (polyethylene resin) added thereto (Comparative Example 8), was found to produce the blister.

The resin composition with a less content of the silicone compound (Comparative Example 5) was found to show poor sliding characteristics.

The resin composition of this invention, capable of suppressing blistering, and of having good sliding characteristics when molded into a molded article, are suitably used for various sliding components.

The invention claimed is:

1. A polyacetal resin composition comprising:
(A) 100 parts by mass of a polyacetal resin;
(B1) a polyolefin resin grafted with a silicone compound;
(B2) a non-grafted silicone compound; and
(C) 0.5 to 1.8 parts by mass of a polyolefinic lubricant,
with a total of content of the silicone compound in the (B1) polyolefin resin and content of the (B2) non-grafted silicone compound, being adjusted to 0.6 to 2.5 parts by mass, per 100 parts by mass of the (A) polyacetal resin, and
with (B1)/(B2), which is a ratio by mass of the content of the (B1) polyolefin resin and the content of the (B2) non-grafted silicone compound, being adjusted to 66/34 to 45/55.

2. The polyacetal resin composition of claim 1, wherein content of the (C) polyolefinic lubricant is 0.7 to 1.8 parts by mass, per 100 parts by mass of the (A) polyacetal resin.

3. A molded article obtainable by molding the polyacetal resin composition described in claim 1.

4. The molded article of claim 3, wherein content of the (C) polyolefinic lubricant is 0.7 to 1.8 parts by mass, per 100 parts by mass of the (A) polyacetal resin.

5. The molded article of claim 3, wherein the molded article is a sliding component.

6. A method for manufacturing the polyacetal resin composition described in claim 1, the method comprising melt-kneading a master batch obtained by kneading the (B2) non-grafted silicone compound into the (A) polyacetal resin, together with the (A) polyacetal resin, and the (B1) polyolefin resin grafted with a silicone compound.

* * * * *